(12) United States Patent
Evans

(10) Patent No.: US 10,124,713 B2
(45) Date of Patent: Nov. 13, 2018

(54) METHOD AND APPARATUS FOR WINDING STRAPS

(71) Applicant: MONSTER DEVICES INC., Peachland (CA)

(72) Inventor: Ryan Wynn Evans, Peachland (CA)

( * ) Notice: Subject to any disclaimer, the term of this patent is extended or adjusted under 35 U.S.C. 154(b) by 534 days.

(21) Appl. No.: 14/796,926

(22) Filed: Jul. 10, 2015

(65) Prior Publication Data
US 2017/0008718 A1    Jan. 12, 2017

(51) Int. Cl.
| B65H 18/00 | (2006.01) |
| B65H 75/30 | (2006.01) |
| B65H 75/42 | (2006.01) |
| B65H 18/04 | (2006.01) |
| B60P 7/08 | (2006.01) |
| B65H 54/58 | (2006.01) |
| B65H 75/44 | (2006.01) |

(52) U.S. Cl.
CPC .......... B60P 7/0846 (2013.01); B65H 54/585 (2013.01); B65H 75/4486 (2013.01)

(58) Field of Classification Search
CPC ........ B60P 7/0846; B60P 1/60; B65H 54/585; B65H 75/4486; B65H 18/04; B65H 18/10; B65H 2403/50; B65H 2701/1842; B65H 2701/375; B65H 75/30; B65H 75/75; B65H 75/425
USPC ........................... 242/539, 532.6, 404.2, 406
See application file for complete search history.

(56) References Cited

U.S. PATENT DOCUMENTS

| 3,113,742 | A | * | 12/1963 | Bevan | H04L 13/06 242/539 |
| 3,185,407 | A | * | 5/1965 | Lichtenstein | B65H 16/06 242/129.53 |
| 3,222,006 | A | * | 12/1965 | Bahnsen | B65H 18/10 242/413.2 |
| 3,954,226 | A | * | 5/1976 | Pickering | B60P 7/0846 242/395 |
| 5,533,689 | A | * | 7/1996 | Chalfant | B65H 18/10 242/532.5 |
| 5,551,647 | A | * | 9/1996 | Browning | B65H 49/305 242/118.5 |
| 5,611,520 | A | * | 3/1997 | Soderstrom | B60P 7/083 24/68 CD |
| 6,068,210 | A | * | 5/2000 | Risa | B65H 54/585 242/395 |
| 6,705,597 | B1 | * | 3/2004 | Reilly | B60P 7/0846 254/223 |

(Continued)

*Primary Examiner* — Michael R Mansen
*Assistant Examiner* — Mark K Buse
(74) *Attorney, Agent, or Firm* — Richard D. Okimaw

(57) ABSTRACT

Disclosed is a method and apparatus for winding cargo straps. The apparatus comprises a base, connectors adapted to secure the base to a portion of a vehicle and a motor supported from the base. The apparatus further comprises a shaft extending from and rotated by the motor, the shaft having a plurality of mounting locations therealong, a guide flange secured around the shaft at one of the plurality of mounting locations and a guide cap secured to a distal end of the shaft. The method comprises securing the base to a vehicle, locating a guide flange at one of the plurality of mounting locations, securing a distal end of the strap to the shaft, locating the guide cap to the distal end of the shaft and actuating the motor to rotate the shaft thereby winding the strap thereon.

17 Claims, 6 Drawing Sheets

(56) References Cited

U.S. PATENT DOCUMENTS

| | | | | |
|---|---|---|---|---|
| 6,729,604 B1 * | 5/2004 | Claycomb | B60P 7/0846 | |
| | | | 24/68 R | |
| 6,908,060 B2 * | 6/2005 | Hibbs | B65H 49/305 | |
| | | | 242/129 | |
| 7,059,588 B2 * | 6/2006 | Goulet | B60P 7/0846 | |
| | | | 254/323 | |
| D536,602 S * | 2/2007 | Childress | D8/359 | |
| 7,422,385 B2 * | 9/2008 | Koeda | B65H 18/10 | |
| | | | 101/228 | |
| 7,497,398 B2 * | 3/2009 | Mehrer | B65B 13/025 | |
| | | | 100/9 | |
| 7,766,271 B1 * | 8/2010 | Confoey | B60P 7/0846 | |
| | | | 24/68 CD | |
| 8,272,820 B2 * | 9/2012 | Numata | B60P 7/083 | |
| | | | 410/100 | |
| 9,016,614 B1 * | 4/2015 | Pouncil | A01K 89/003 | |
| | | | 242/566 | |
| 9,616,801 B2 * | 4/2017 | Williams | B60P 7/0853 | |
| 9,676,590 B1 * | 6/2017 | Berry | B65H 75/241 | |
| 9,707,136 B2 * | 7/2017 | Broten | A61F 15/007 | |
| 2004/0089761 A1 * | 5/2004 | Tsao | A62C 33/04 | |
| | | | 242/530.2 | |
| 2007/0075177 A1 * | 4/2007 | Mehrer | B65B 13/025 | |
| | | | 242/533 | |
| 2007/0114320 A1 * | 5/2007 | Johns | A61F 15/007 | |
| | | | 242/532.6 | |
| 2007/0145179 A1 * | 6/2007 | Engelsher | A61F 15/007 | |
| | | | 242/532.6 | |
| 2012/0145820 A1 * | 6/2012 | White | B60P 7/0846 | |
| | | | 242/532.6 | |
| 2013/0101368 A1 * | 4/2013 | Booher | B60P 7/083 | |
| | | | 410/103 | |
| 2014/0110520 A1 * | 4/2014 | Hampson | B60P 7/0846 | |
| | | | 242/395 | |
| 2014/0166800 A1 * | 6/2014 | Hsieh | B65H 26/06 | |
| | | | 242/390.1 | |
| 2016/0046228 A1 * | 2/2016 | Williams | B60P 7/0846 | |
| | | | 410/98 | |

* cited by examiner

METHOD AND APPARATUS FOR WINDING STRAPS

BACKGROUND OF THE INVENTION

1. Field of Invention

The present invention relates to transportation in general and in particular to a method and apparatus for winding straps.

2. Description of Related Art

In the field of transportation, articles to be transported are frequently located upon flat deck trailers or trucks and secured thereto. One common method of securing such articles to a vehicle is to utilize cargo straps or other flexible tense all members which may be extended over the article and thereafter fastened to the deck. Such straps are commonly formed of nylon, polyester or the like.

One, difficulty experience with the use of such straps is the need to keep such cargo scraps neat and organized in between uses. One common method of maintaining the organization of cargo straps is to roll them into cylindrical or just shapes for compact storage and transportation. However, rolling such straps by hand is a time consuming and difficult task to complete.

Previous attempts have been made to automate the rolling of cargo straps, however such attempts have had drawbacks. In particular, motorized shafts have been provided which may be utilized to wind the straps thereon. Disadvantageously, such devices have required considerable user input to ensure the strap remains straight during any role in operation. An example of such devices may be found in US patent application publication number US2012/0145820 to White.

SUMMARY OF THE INVENTION

According to a first embodiment of the present invention there is disclosed an apparatus for winding straps comprising a base, connectors adapted to secure the base to a portion of a vehicle and a motor supported from the base. The apparatus further comprises a shaft extending from and rotated by the motor, the shaft having a plurality of mounting locations therealong, a guide flange secured around the shaft at one of the plurality of mounting locations and a guide cap secured to a distal end of the shaft.

Each of the plurality of mounting locations may comprise a bore extending transversely through the shaft. The shaft may include a longitudinal slot extending into a distal end thereof. The bores may extend through the shaft transversely to the slot. The shaft may be formed of a ferromagnetic material. The guide cap may include a magnet.

The guide flange may include bores therethrough corresponding to the plurality of bores in the shaft. The apparatus may further comprise fastening pins adapted to pass through the bores in the guide flange and the shaft to secure the guide flange at a desired location along the shaft. The guide flange may include spring loaded pins adapted to be selectably engageable within one of the plurality of bores of the shaft.

The motor may be electric. The apparatus may further comprise a battery operably connected to the motor. The apparatus may further comprise comprising a power cord operably connected to the motor. The at least one connector may comprise a clamp.

According to a further embodiment of the present invention there is disclosed a method for winding straps comprising securing a base to a vehicle and locating a guide flange at one of a plurality of mounting locations along a shaft extending from a motor mounted on the base corresponding to a width between the guide flange and a guide cap connectable to a distal end of the flange. The method further comprises securing a distal end of a strap to the shaft, locating the guide cap to the distal end of the shaft to contain the strap between the guide cap and the guide flange and actuating the motor to rotate the shaft thereby winding the strap thereon.

The locating step may comprise passing a pin through bores in the guide flange and one of a plurality of bores on the shaft. The locating step may comprise engaging a radially biased pin extending from the guide flange into one of a plurality of bores on the shaft. The apparatus may further comprise removing the guide cap and thereafter slidably removing the strap from the shaft after the strap is wound into a roll.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
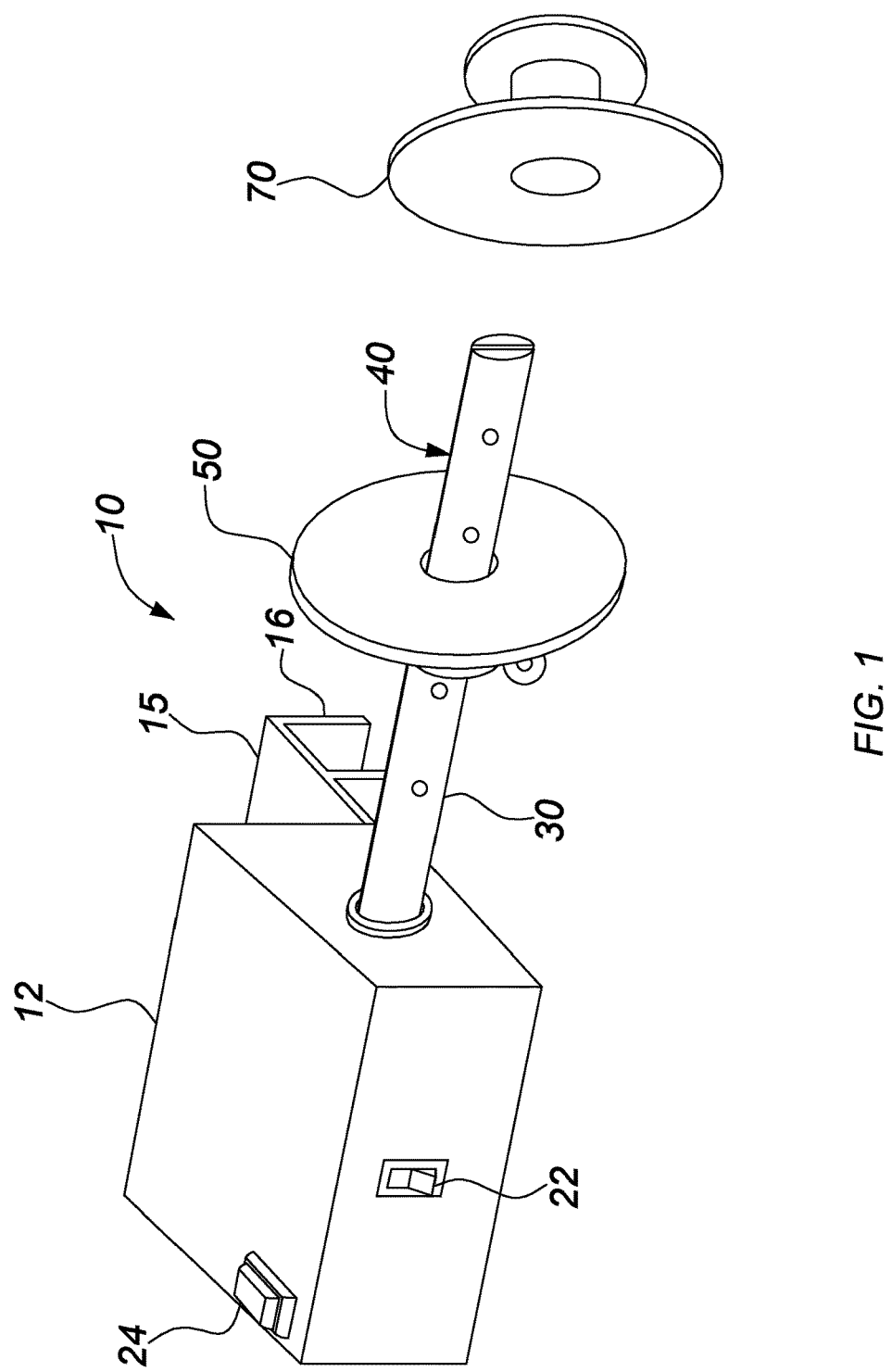
FIG. 1 is a perspective view of an apparatus for winding straps mounted to a trailer according to a first embodiment of the present invention.

Referring to FIG. 1, an apparatus for winding a strap 8 into a roll according to a first embodiment of the invention is shown generally at 10. The apparatus comprises a motor 12 securable to a vehicle 6. The motor 12 rotates a shaft 30 having a guide flange 50 and a guide cap 70 therein between which the strap is wound as will be more fully described below.

Figure 2:
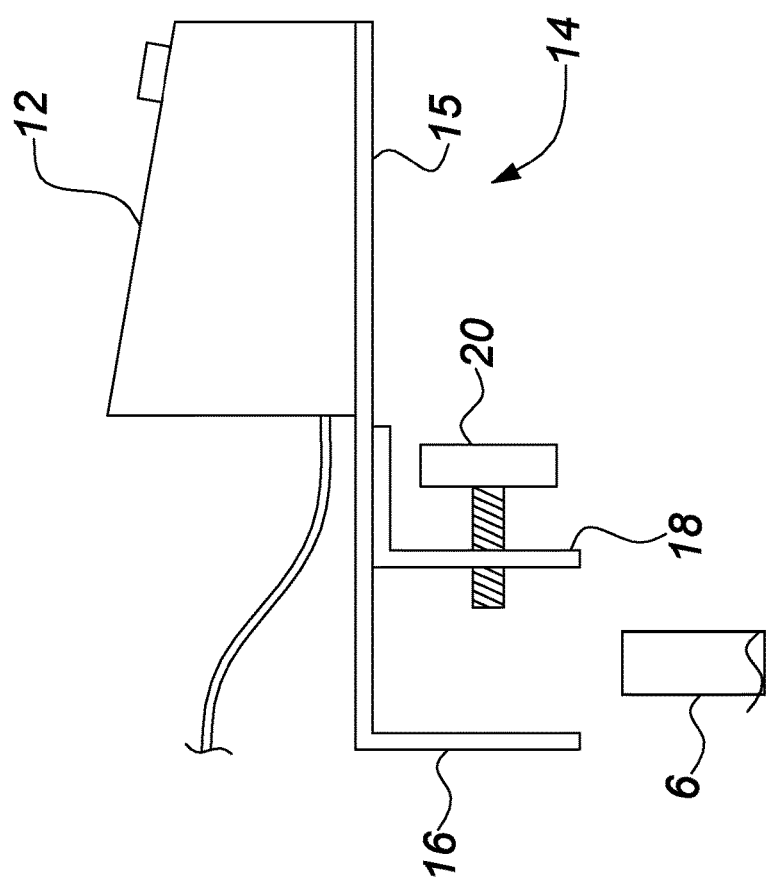
FIG. 2 is a side view of the apparatus of FIG. 1.

The motor 12 may be of any conventional type, such as by way of non-limiting example, electric, pneumatic or hydraulic. It will be appreciated that the motor 12 may be powered by a power source located on the vehicle through a power cable 26 or may optionally include a battery (not shown) which may be recharged as required by any conventional means. As illustrated in FIG. 2, the motor includes a mounting assembly, generally indicated at 14 for securing the apparatus to a portion of a vehicle 6. In particular, the mounting assembly 14 may comprise a plate 15 to which the motor 12 is secured using any known means, such as, by way of non-limiting example, fasteners, welding, adhesives or the like. The mounting assembly 14 includes an end backing plate 16 and a parallel spaced apart clamping plate 18 extending downwardly therefrom. The clamping plate 18 includes a threaded member 20 extending therethrough adapted to be turned within the clamping plate 18 so as to clamp a portion of the vehicle 6 between the threaded member and the backing plate 16 thereby securing the plate 15 and motor 12 to a vehicle 6. It will be appreciated that the motor may be contained within a casing as illustrated in FIG. 1. The motor may also have an associated power switch 22 and/or activation button 24. In operation, the power switch may enable operation wherein the activation button may cause the motor shaft to rotate.

The apparatus 10 includes a shaft 30 extending from the motor 12 which is adapted to be turned by the motor. It will be appreciated that the shaft 30 may be secured directly to or co-formed with the motor shaft (not shown) or may be connected thereto and rotated thereby through a gear or other drive assembly. The shaft 30 extends between proximate and distal ends, 32 and 34, respectively wherein the proximate end 32 may include a bore 36 for securing to an output shaft 26 from the motor 12. The bore 36 may be secured over the output shaft 26 through any conventional means, such a threading, fasteners, adhesives, welding or the like. The shaft 30 includes a slot 40 extending along a portion of the length thereof from the distal end 34.

Figure 3:
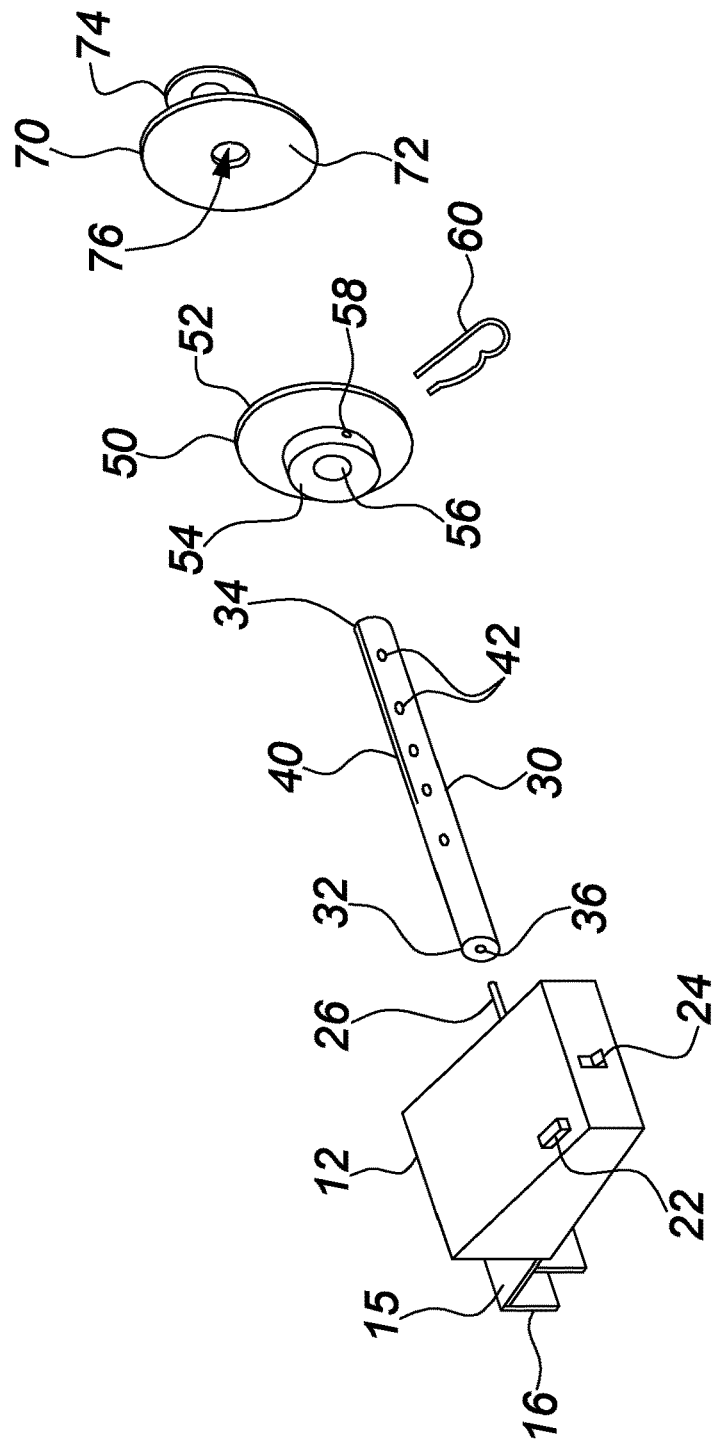
FIG. 3 is an exploded view of the apparatus of FIG. 1.

The slot 40 has a width corresponding to the thickness of a strap to be wound, such as, by way of non-limiting example, between ⅛ and ⅜ inches (3 and 10 mm). The slot 40 has a length adapted to extend along the shaft 30 a sufficient length to permit a range of straps to be inserted therein, such as up to 80 percent of a shaft, although it will be appreciated that greater percentages may be utilized provided the shaft retains sufficient strength. The shaft 30 further includes a plurality of transverse bores 42 extending therethrough. As illustrated in FIG. 3, the transverse bores 42 extend transversely to the slot 40 so as to pass therethrough. The transverse bores 42 are located at locations along the shaft 30 selected to receive and retain a strap between the guide flange 50 and the guide cap 70 as will be more fully described below. The shaft 30 may be formed of a magnetic material or may optionally have magnets embedded therein so as to retain the guide cap thereon as will be more fully described below.

Figure 6:
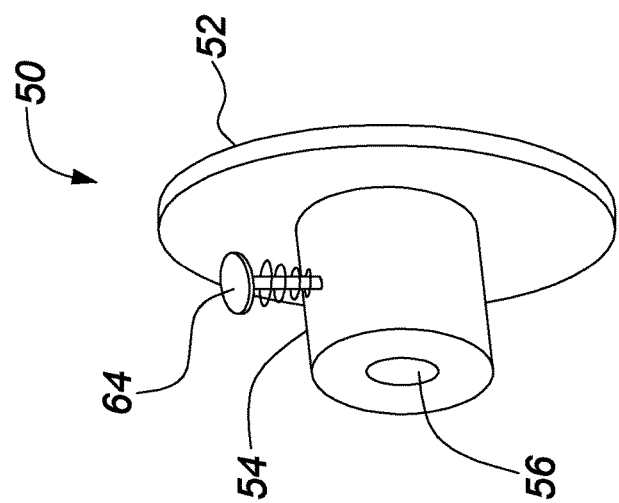
FIG. 6 is a perspective view of a guide flange according to a further embodiment of the present invention.

The guide flange 50 comprises a body having a flange portion 52 and a collar portion 54 extending therefrom. The flange and collar portions each include a bore 56 therethrough sized to correspond to the shaft 30. The collar portion 54 includes a locating bore 58 therethrough sized to receive a pin 60 or other fasteners therethrough. In operation, the pin 60 may be passed through the locating bore 58 and an aligned transverse bore 42 in the shaft to fix the location of the guide flange 50 upon the shaft 30. Alternatively, it will be appreciated that other means for locating the guide flange at a desired location may also be utilized such as indentations, spring loaded pins 64 or the like as illustrated in FIG. 6.

Figure 4:
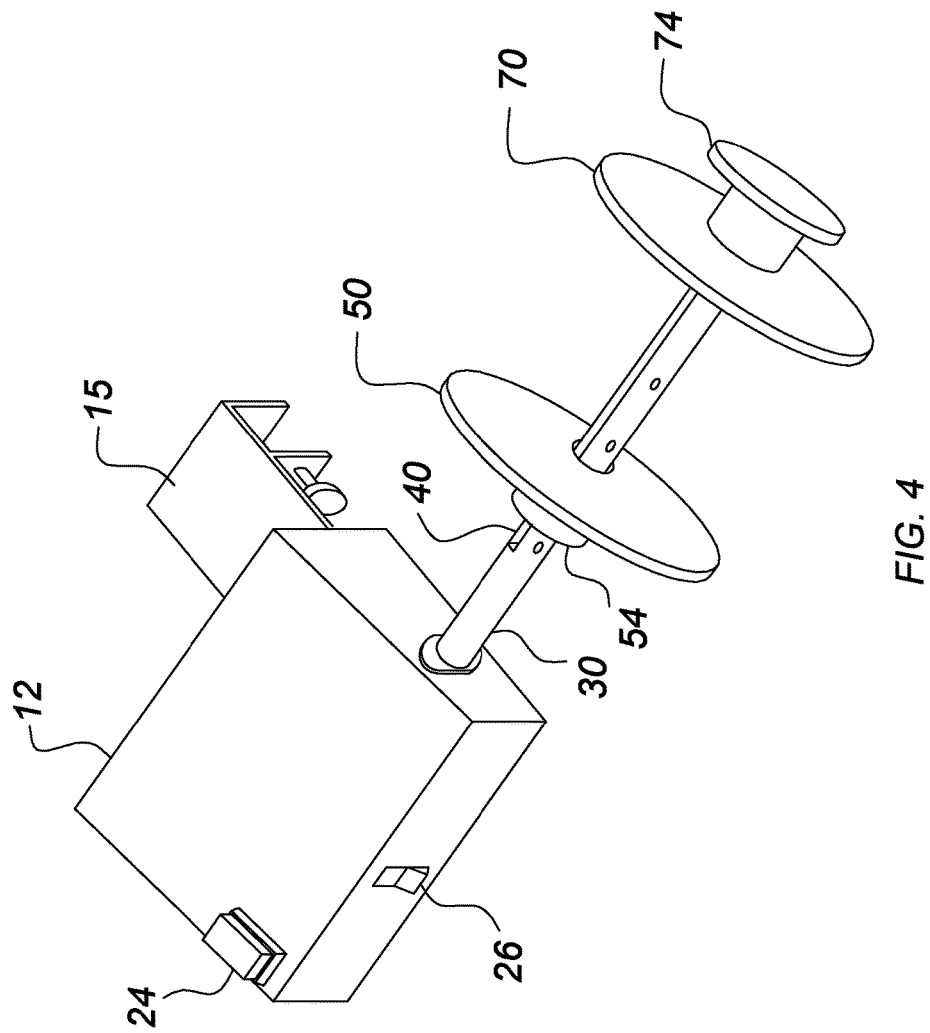
FIG. 4 is a perspective view of the apparatus of FIG. 1 with the guide flange positioned to receive a strap.
Figure 5:
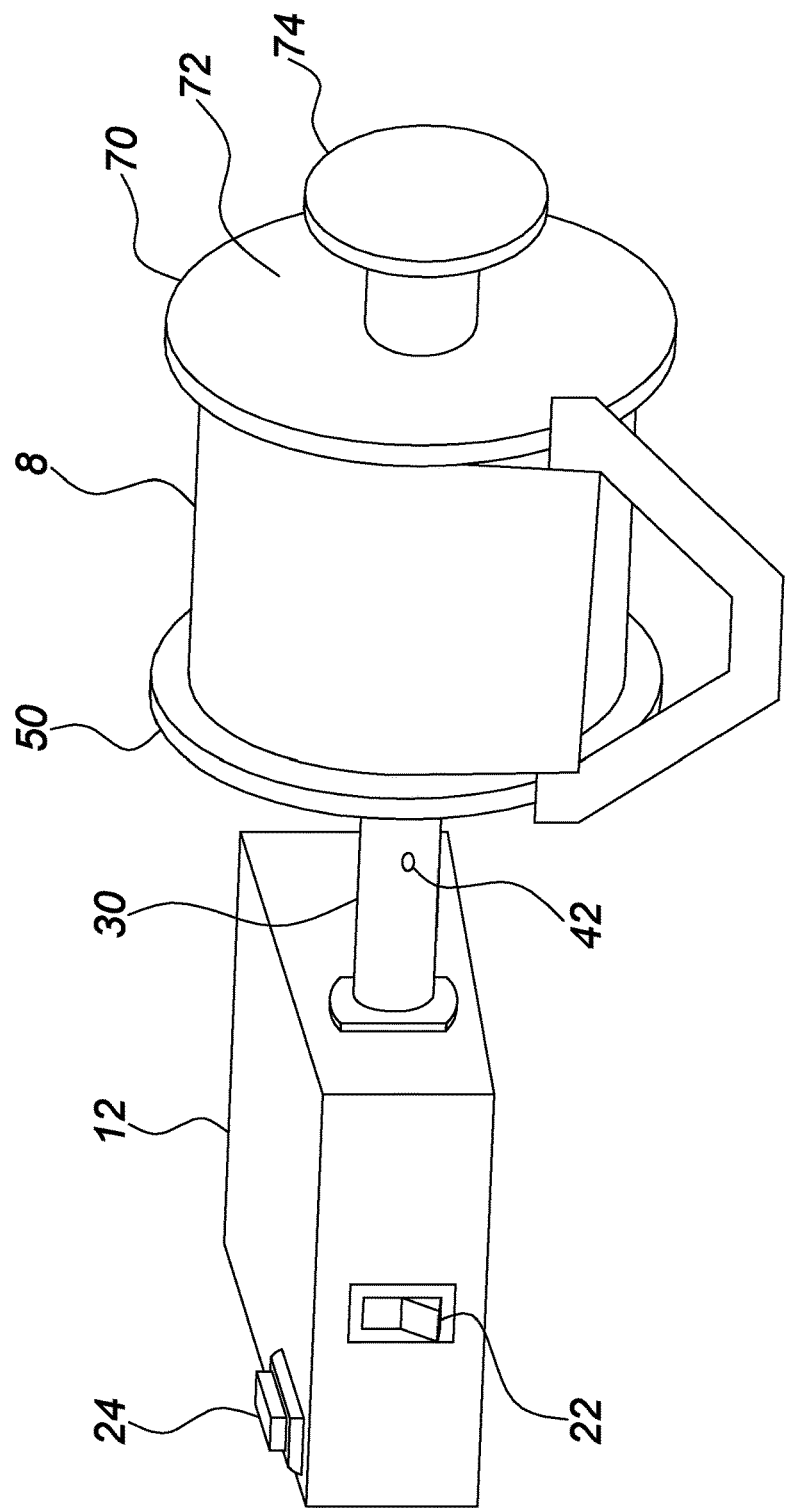
FIG. 5 is a perspective view of the apparatus of FIG. 1 with a strap wound therearound.

The guide cap 70 comprises a body having a flange portion 72 and a collar portion 74 extending therefrom. The flange and collar portions include a blind bore 76 which does not extend completely through the collar portion 74 as illustrated in FIGS. 4 and 5. The guide cap 70 is formed of a ferromagnetic material or may optionally include magnets embedded therein so as to be drawn towards the shaft 30 such that the distal end 34 of the shaft is drawn into and located within the blind bore 76. Optionally, the blind bore 76 of the guide cap 70 may include alternative means for retaining the guide cap 70 upon the distal end 34 of the shaft 30, such as, by way of non-limiting example, snap rings, annular ridges, friction fit, spring loaded rollers or the like as are commonly known.

In Operation, the guide flange 50 may be located along the shaft at a location corresponding to the width of the strap to be wound and a pin 60 passed through the locating bores 58 and transverse bore 42 to fix the position thereof. Thereafter, blind bore 76 of the guide cap 70 may be located upon the distal end 34 of the shaft such that the distal end 34 is retained therein by the magnets. A free end of the strap may then be passed through the slot 40 between the guide flange 50 and the guide cap 70 and the motor turned on by the activation button 24 to rotate the shaft 30 thereby winding the strap about the shaft to a wound position as illustrated in FIG. 5. Thereafter, the guide cap 70 may be removed from the shaft 30 and the wound strap 30 slidably removed from the end of the shaft quickly and neatly.

While specific embodiments of the invention have been described and illustrated, such embodiments should be considered illustrative of the invention only and not as limiting the invention as construed in accordance with the accompanying claims.

What is claimed is:

1. An apparatus for winding straps comprising:
a mounting assembly;
at least one connector adapted to secure said mounting assembly to a portion of a vehicle;
a motor supported from said mounting assembly;
a shaft extending from and rotated by said motor to a free distal end, said shaft having a plurality of mounting locations therealong;
a guide flange secured around said shaft at one of said plurality of mounting locations between said motor and said free distal end of said shaft; and
a guide cap secured to said free distal end of said shaft.

2. The apparatus of claim 1 wherein each of said plurality of mounting locations comprises a bore extending transversely through said shaft.

3. The apparatus of claim 2 wherein said shaft includes a longitudinal slot extending into a distal end thereof.

4. The apparatus of claim 3 wherein said bores extend through said shaft transversely to said slot.

5. The apparatus of claim 2 wherein said guide flange includes bores therethrough corresponding to said plurality of bores in said shaft.

6. The apparatus of claim 5 further comprising a fastening pin adapted to pass through said bores in said guide flange and said shaft to secure said guide flange at a desired location along said shaft.

7. The apparatus of claim 2 wherein said guide flange includes a spring loaded pull pin adapted to be selectably engageable within one of said plurality of bores of said shaft.

8. The apparatus of claim 1 wherein said shaft is formed of a ferromagnetic material.

9. The apparatus of claim 8 wherein said guide cap includes a magnet.

10. The apparatus of claim 1 wherein said motor is electric.

11. The apparatus of claim 10 further comprising a battery operably connected to said motor.

12. The apparatus of claim 10 further comprising a power cord operably connected to said motor.

13. The apparatus of claim 1 wherein said at least one connector comprises a clamp.

14. A method for winding straps comprising:
securing a mounting assembly to a vehicle;
locating a guide flange at one of a plurality of mounting locations along a shaft extending from a motor to a free distal end, the motor mounted on said mounting assembly corresponding to a width between said guide flange and a guide cap connectable to a distal end of said flange;
securing a distal end of a strap to said shaft;

locating said guide cap to said free distal end of said shaft to contain said strap between said guide cap and said guide flange; and actuating said motor to rotate said shaft thereby winding said strap thereon.

15. The apparatus of claim 14 wherein said locating step comprises passing a pin through bores in said guide flange and one of a plurality of bores on said shaft.

16. The apparatus of claim 14 wherein said locating step comprises engaging a radially biased pin extending from said guide flange into one of a plurality of bores on said shaft.

17. The apparatus of claim 14 further comprising removing said guide cap and thereafter slidably removing said strap from said shaft after said strap is wound into a roll.

* * * * *